(12) United States Patent
Uchida et al.

(10) Patent No.: US 11,333,098 B2
(45) Date of Patent: May 17, 2022

(54) ENGINE CONTROLLER AND ENGINE CONTROL METHOD

(71) Applicant: TOYOTA JIDOSHA KABUSHIKI KAISHA, Toyota (JP)

(72) Inventors: Akito Uchida, Toyota (JP); Koji Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/148,687

(22) Filed: Jan. 14, 2021

(65) Prior Publication Data
US 2021/0246847 A1 Aug. 12, 2021

(30) Foreign Application Priority Data
Feb. 7, 2020 (JP) .............................. JP2020-019804

(51) Int. Cl.
| | | |
|---|---|---|
| *B60T 1/00* | (2006.01) | |
| *F02D 41/38* | (2006.01) | |
| *F02B 37/18* | (2006.01) | |
| *F02B 37/22* | (2006.01) | |
| *F02D 41/00* | (2006.01) | |
| *F02M 35/10* | (2006.01) | |

(52) U.S. Cl.
CPC ............ *F02D 41/38* (2013.01); *F02B 37/183* (2013.01); *F02B 37/22* (2013.01); *F02D 41/0007* (2013.01); *F02M 35/10157* (2013.01); *F02D 2041/389* (2013.01); *F02D 2200/04* (2013.01)

(58) Field of Classification Search
CPC ........... F02D 2200/10; F02D 2200/021; F02D 2200/101; F02D 2200/0404; F02D 2200/0414; F02D 2200/703; F02D 41/18; F02D 41/182; F02D 41/185; F02D 41/187; F02D 41/021; F02D 41/1497
See application file for complete search history.

(56) References Cited

U.S. PATENT DOCUMENTS

| | | | |
|---|---|---|---|
| 2005/0000480 A1* | 1/2005 | Yasui | F02D 13/023 123/90.16 |
| 2008/0051979 A1* | 2/2008 | Yasui | F02D 41/0002 701/105 |
| 2017/0276063 A1 | 9/2017 | Shiwa | |
| 2020/0018253 A1* | 1/2020 | Yamada | F02D 13/0234 |
| 2021/0148296 A1* | 5/2021 | Hayashi | F02D 41/021 |

FOREIGN PATENT DOCUMENTS

| | | |
|---|---|---|
| EP | 3 594 481 A1 | 1/2020 |
| JP | 8-61135 A | 3/1996 |
| JP | 2005-69019 A | 3/2005 |
| JP | 2010-25126 A | 2/2010 |
| JP | 2021-80862 A | 5/2021 |

* cited by examiner

*Primary Examiner* — John Kwon
(74) *Attorney, Agent, or Firm* — Oblon, McClelland, Maier & Neustadt, L.L.P.

(57) ABSTRACT

An engine controller calculates a pulsation correction value based on actuation states of an air bypass valve (ABV) and a wastegate valve (WGV) that change the shape of intake and exhaust flow passages of an exhaust turbocharger. The pulsation correction value is used to compensate for an output error of an airflow meter caused by intake pulsation. The engine controller also calculates a fuel injection amount of an injector, based on an output of the airflow meter that has been corrected based on the pulsation correction value.

5 Claims, 3 Drawing Sheets

| Base Correction Coefficient C1 | Forced Induction Correction Coefficient C2 | AICV | | ABV | | WGV | |
|---|---|---|---|---|---|---|---|
| | | Open | Closed | Open | Closed | Normally Closed Control | Normally Open Control |
| M1 | M9 | ○ | – | ○ | – | ○ | – |
| M2 | M10 | ○ | – | ○ | – | – | ○ |
| M3 | M11 | ○ | – | – | ○ | ○ | – |
| M4 | M12 | ○ | – | – | ○ | – | ○ |
| M5 | M13 | – | ○ | ○ | – | ○ | – |
| M6 | M14 | – | ○ | ○ | – | – | ○ |
| M7 | M15 | – | ○ | – | ○ | ○ | – |
| M8 | M16 | – | ○ | – | ○ | – | ○ |

ENGINE CONTROLLER AND ENGINE CONTROL METHOD

BACKGROUND

1. Field

The following description relates to an engine controller and an engine control method.

2. Description of Related Art

Japanese Laid-Open Patent Publication No. 08-061135 describes an engine controller that determines an amount of fuel injected from an injector based on an output of an airflow meter arranged in an intake passage. The engine controller described in this publication is used for an engine including a mechanical supercharger that actuates when receiving rotation of the engine. The mechanical supercharger is configured to be switchable between a non-forced-induction state in which the supercharger is uncoupled from the crankshaft of the engine, a low forced induction state in which the rotation ratio of the supercharger to the crankshaft is set to be low, and a high forced induction state in which the rotation ratio is set to be high. The engine controller described in this publication uses a forced induction correction coefficient, which compensates for an output error of the airflow meter caused by intake pulsation, and changes the forced induction correction coefficient based on which one of the three states the mechanical supercharger is in.

A change in the forced induction state of the mechanical supercharger changes the behavior of intake air flowing in the intake passage and changes a generation state of intake pulsation. The prior art engine controller is configured to compensate for an output error of the airflow meter caused by intake pulsation while reflecting changes in the generation state of the intake pulsation in a forced induction state.

An engine provided with an exhaust turbocharger may include an air bypass valve and a wastegate valve. The air bypass valve is arranged in an intake bypass that bypasses a compressor wheel and allows intake air to flow. The wastegate valve is arranged in an exhaust bypass that bypasses a turbine wheel and allows exhaust gas to flow. The air bypass valve and the wastegate valve are variable mechanisms that change the shape of an intake flow passage or an exhaust flow passage arranged in the exhaust turbocharger, thereby varying rotation speed of the compressor wheel and thus varying the forced induction state of the turbocharger. In such an engine, the forced induction state may be the same in different actuation states of the variable mechanisms. The generation state of intake pulsation in the intake passage also changes when the variable mechanisms change the shapes of the intake flow passage and the exhaust flow passage in the exhaust turbocharger. Therefore, compensation for an output error of the airflow meter caused by intake pulsation based on only the forced induction state of the exhaust turbocharger may be inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above problem, a first aspect of the present invention provides an engine controller used for an engine. The engine includes an airflow meter arranged in an intake passage, an exhaust turbocharger including a compressor wheel arranged in the intake passage downstream of the airflow meter and a turbine wheel arranged in an exhaust passage, a throttle valve arranged in the intake passage downstream of the compressor wheel, a variable mechanism that changes a shape of a gas flow passage of the exhaust turbocharger, and an injector that is operated by the engine controller and injects fuel that is burned in a combustion chamber. The engine controller includes an arithmetic processing device configured to execute a correction value calculation process, a correction process, an injection amount calculation process, and an operation process. The correction value calculation process calculates a pulsation correction value based on a rotation speed of the engine, an opening degree of the throttle valve, a boost pressure, and an actuation state of the variable mechanism. The pulsation correction value is used to compensate for an output error of the airflow meter caused by intake pulsation. The correction process corrects an output of the airflow meter using the pulsation correction value. The injection amount calculation process calculates a fuel injection amount of the injector, based on the output of the airflow meter that has been corrected by the correction process. The operation process operates the injector to inject fuel corresponding to a value of the fuel injection amount calculated by the injection amount calculation process.

To solve the above problem, a second aspect of the present invention provides an engine controller used for an engine. The engine includes an airflow meter arranged in an intake passage, an exhaust turbocharger including a compressor wheel arranged in the intake passage downstream of the airflow meter and a turbine wheel arranged in an exhaust passage, a throttle valve arranged in the intake passage downstream of the compressor wheel, a variable mechanism that changes a shape of a gas flow passage of the exhaust turbocharger, and an injector that is operated by the engine controller and injects fuel that is burned in a combustion chamber. The engine controller includes circuitry as an arithmetic processing device. The circuitry is configured to execute a correction value calculation process, a correction process, an injection amount calculation process, and an operation process. The correction value calculation process calculates a pulsation correction value based on a rotation speed of the engine, an opening degree of the throttle valve, a boost pressure, and an actuation state of the variable mechanism. The pulsation correction value is used to compensate for an output error of the airflow meter caused by intake pulsation. The correction process corrects an output of the airflow meter using the pulsation correction value. The injection amount calculation process calculates a fuel injection amount of the injector, based on the output of the airflow meter that has been corrected by the correction process. The operation process operates the injector to inject fuel corresponding to a value of the fuel injection amount calculated by the injection amount calculation process.

To solve the above problem, a third aspect of the present invention provides an engine control method used for an engine. The engine includes an airflow meter arranged in an intake passage, an exhaust turbocharger including a compressor wheel arranged in the intake passage downstream of the airflow meter and a turbine wheel arranged in an exhaust passage, a throttle valve arranged in the intake passage downstream of the compressor wheel, a variable mechanism that changes a shape of a gas flow passage of the exhaust turbocharger, and an injector that is operated by the engine controller and injects fuel that is burned in a combustion chamber. The engine control method includes a correction value calculation process, a correction process, an injection amount calculation process, and an operation process. The correction value calculation process calculates a pulsation correction value based on a rotation speed of the engine, an opening degree of the throttle valve, a boost pressure, and an actuation state of the variable mechanism. The pulsation correction value is used to compensate for an output error of the airflow meter caused by intake pulsation. The correction process corrects an output of the airflow meter using the pulsation correction value. The injection amount calculation process calculates a fuel injection amount of the injector, based on the output of the airflow meter that has been corrected by the correction process. The operation process operates the injector to inject fuel corresponding to a value of the fuel injection amount calculated by the injection amount calculation process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Figure 1:
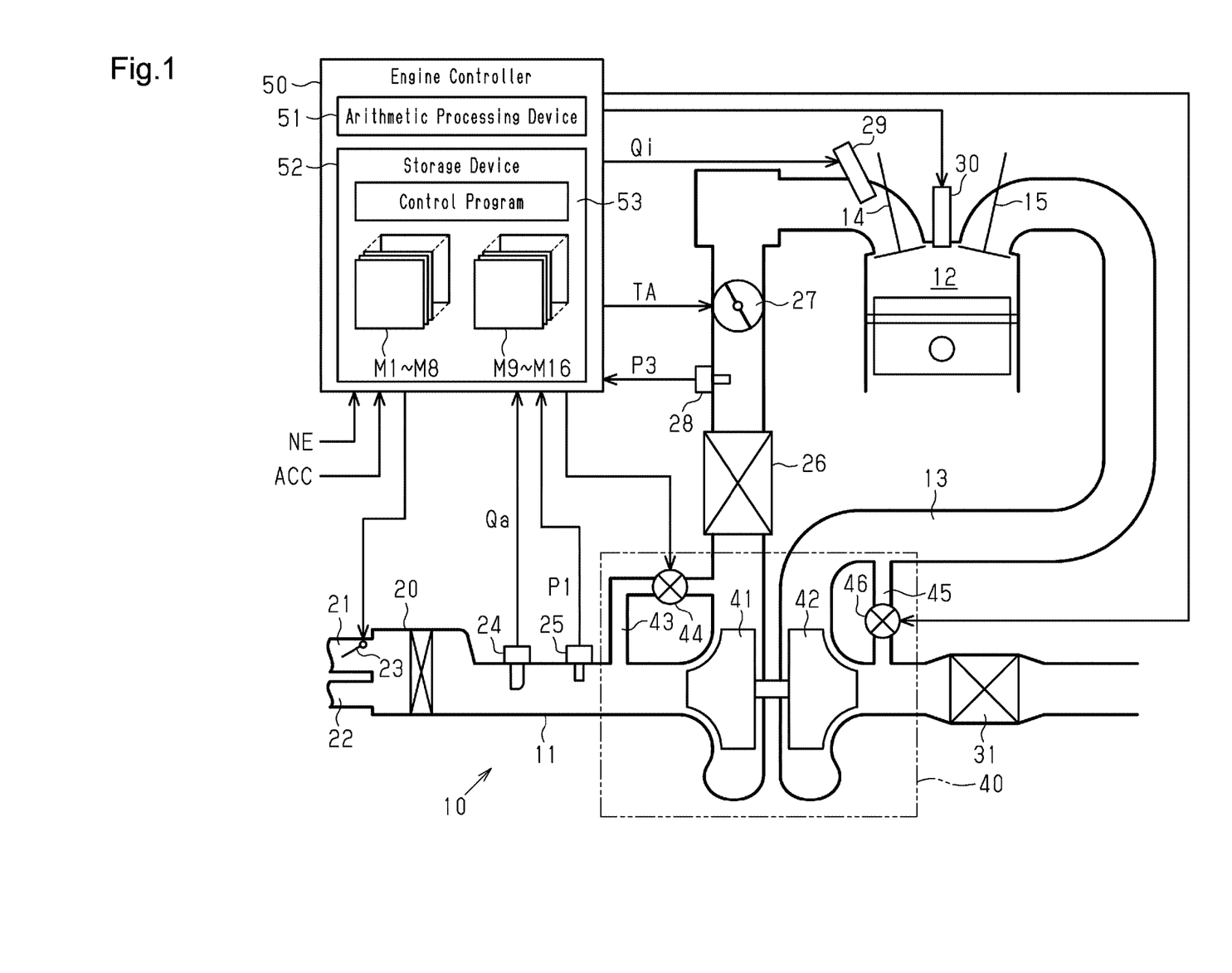
FIG. 1 is a schematic diagram showing the configuration of an embodiment of an engine controller.

An embodiment of an engine controller will be described below with reference to FIGS. 1 to 3.

The configuration of an engine 10 for which the present embodiment of an engine controller 50 is used will now be described with reference to FIG. 1. As shown in FIG. 1, the engine 10 includes an exhaust turbocharger 40 that includes a compressor wheel 41 arranged in an intake passage 11 and a turbine wheel 42 arranged in an exhaust passage 13.

An air cleaner 20 is arranged in the intake passage 11 to filter out foreign substances such as dust in the intake air. The air cleaner 20 is connected to two air ducts 21 and 22 having different pipe lengths. An air intake control valve 23 (AICV) is arranged in one of the two air ducts (21). When the AICV 23 is closed, the air duct 21 is closed and outside air is drawn into the air cleaner 20 only through the other air duct 22. When the AICV 23 is open, the air duct 21 is open and outside air is drawn into the air cleaner 20 through the two air ducts 21 and 22.

In the intake passage 11, an airflow meter 24 is arranged downstream of the air cleaner 20 to output a signal corresponding to the flow rate of the intake air in the intake passage 11. The airflow meter 24 is a hot wire airflow meter including a hot wire arranged in the intake passage 11. When intake air passes the hot wire of the airflow meter 24, which is heated by voltage application, and removes heat from the hot wire, the resistance of the hot wire changes and current flowing through the hot wire changes. As the flow rate of intake air in the intake passage 11 increases, the amount of heat removed by the intake air from the hot wire increases. The airflow meter 24 obtains the intake air flow rate from the current value of the hot wire and outputs a signal corresponding to the obtained intake air flow rate.

The compressor wheel 41 is arranged in the intake passage 11 downstream of the airflow meter 24. An intercooler 26 is arranged in the intake passage 11 downstream of the compressor wheel 41 to cool the intake air that is compressed by the compressor wheel 41 and has a high temperature. A throttle valve 27 is arranged in the intake passage 11 downstream of the intercooler 26. In addition, an injector 29 is arranged in the intake passage 11 downstream of the throttle valve 27 to inject fuel into intake air that flows into a combustion chamber 12.

The combustion chamber 12 is connected to the intake passage 11 by an intake valve 14. When the intake valve 14 is open, an air-fuel mixture of intake air and fuel is drawn into the combustion chamber 12 from the intake passage 11. An ignition device 30 is arranged on the combustion chamber 12 to ignite the air-fuel mixture using spark discharge. The combustion chamber 12 is connected to the exhaust passage 13 by an exhaust valve 15. When the exhaust valve 15 is open, exhaust gas generated by combustion of the air-fuel mixture in the combustion chamber 12 is discharged to the exhaust passage 13.

The turbine wheel 42 is arranged in the exhaust passage 13. The turbine wheel 42 and the compressor wheel 41 are coupled to rotate integrally with each other. In addition, an exhaust purifying catalyst device 31 is arranged in the exhaust passage 13 downstream of the turbine wheel 42 to remove toxic components from the exhaust gas.

The exhaust turbocharger 40 includes an intake bypass 43 and an air bypass valve 44 (ABV) arranged in the intake bypass 43. The intake bypass 43 is a passage for intake air. The intake bypass 43 bypasses the compressor wheel 41 and connects a portion of the intake passage 11 located upstream of the compressor wheel 41 and a portion of the intake passage 11 located downstream of the compressor wheel 41. When the ABV 44 is open, the intake air is allowed to flow through the intake bypass 43. When the ABV 44 is closed, the flow of the intake air is interrupted. When the ABV 44 is open, the intake flow passage of the exhaust turbocharger 40 is the intake bypass 43 and the portion of the intake passage 11 where the compressor wheel 41 is arranged. When the ABV 44 is closed, the intake bypass 43 is closed, and thus the intake flow passage of the exhaust turbocharger 40 is only the portion of the intake passage 11 where the compressor wheel 41 is arranged. As described above, the ABV 44 is a variable mechanism that changes the shape of the intake flow passage in the exhaust turbocharger 40.

The exhaust turbocharger 40 includes an exhaust bypass 45 and a wastegate valve 46 (WGV) arranged in the exhaust bypass 45. The exhaust bypass 45 is a passage for exhaust gas. The exhaust bypass 45 bypasses the turbine wheel 42 and connects a portion of the exhaust passage 13 located upstream of the turbine wheel 42 and a portion of the exhaust passage 13 located downstream of the turbine wheel 42. When the WGV 46 is open, the exhaust gas is allowed to flow through the exhaust bypass 45. When the WGV 46 is closed, the flow of the exhaust gas is interrupted. The WGV 46 is an electrically-driven valve. When the WGV 46 is open, the exhaust flow passage of the exhaust turbocharger 40 is the exhaust bypass 45 and the portion of the exhaust passage 13 where the turbine wheel 42 is arranged. When the WGV 46 is closed, the exhaust bypass 45 is closed, and thus the exhaust flow passage of the exhaust turbocharger 40 is only the portion of the exhaust passage 13 where the turbine wheel 42 is arranged. As described above, the WGV 46 is a variable mechanism that changes the shape of the exhaust flow passage in the exhaust turbocharger 40.

The engine controller 50 includes an arithmetic processing device 51 that executes various types of arithmetic processes related to control of the engine 10 and a storage device 52 that stores a control program 53 and control data in advance. The engine controller 50 receives an AFM output Qa, which is a voltage signal output from the airflow meter 24. The engine controller 50 also receives a detection signal from a pressure sensor 25 arranged in the intake passage 11 upstream of the compressor wheel 41 and a detection signal from a pressure sensor 28 arranged in the intake passage 11 downstream of the compressor wheel 41. In the description hereafter, pressure of intake air detected by the pressure sensor 25 is referred to as a compressor inlet pressure P1, and pressure of intake air detected by the pressure sensor 28, that is, a boost pressure, is referred to as a compressor outlet pressure P3. The engine controller 50 also receives detections signals of, for example, a throttle opening degree TA, which is an opening degree of the throttle valve 27, an engine rotation speed NE, and an accelerator pedal depression amount ACC of the driver. The engine controller 50 calculates instruction values of the throttle opening degree TA, a fuel injection amount Qi, and an ignition timing Aop based on the detection signals of the sensors described above. The engine controller 50 transmits instruction signals to the throttle valve 27, the injector 29, and the ignition device 30 based on the calculation results to control the running state of the engine 10. The engine control performed by the engine controller 50 is achieved by the arithmetic processing device 51 retrieving and executing the control program 53 stored in the storage device 52.

The engine controller 50 drives and controls the AICV 23 as part of the control of the engine 10. More specifically, when load on the engine 10 and rotation speed of the engine 10 are high, and a large amount of air is drawn into the intake passage 11 from the outside, the engine controller 50 opens the AICV 23. In this case, the outside air is drawn from the two air ducts 21 and 22. This reduces pressure loss when drawing in the outside air. When the load on the engine 10 and the rotation speed of the engine 10 are not high, the engine controller 50 closes the AICV 23. In this case, the air duct 21 is closed, so that intake air noise is reduced.

The engine controller 50 controls the WGV 46 as described below. The engine controller 50 is used for a vehicle configured to switch a travel mode of the vehicle between a sport travel mode that gives priority to output performance and an economy travel mode that gives priority to fuel efficiency performance. In the sport travel mode, the engine controller 50 executes normally closed control on the WGV 46 that basically opens the WGV 46 only when the boost pressure is excessive, and otherwise keeps the WGV 46 closed in order to improve an acceleration response of the engine 10. In the economy travel mode, the engine controller 50 executes normally open control on the WGV 46 that closes the WGV 46 when there is a request for a high output, and otherwise keeps the WGV 46 open in order to reduce a pumping loss of the engine 10 in a partial operating range.

The engine controller 50 controls the ABV 44 in the following manner. When the exhaust turbocharger 40 is performing a forced induction, the throttle valve 27 may be closed for deceleration. In this case, the portion of the intake passage 11 between the compressor wheel 41 and the throttle valve 27 is temporarily compressed to a high pressure. This is because it takes a certain time from when the throttle valve 27 is closed until the flow rate of exhaust gas in the turbine wheel 42 is decreased and the rotation speed of the compressor wheel 41 is decreased. When the highly compressed air remains in the portion of the intake passage 11 between the compressor wheel 41 and the throttle valve 27, the engine 10 may be reaccelerated. In this case, the confined highly compressed air slows the rotation of the compressor wheel 41 and delays the reacceleration of the engine 10. In this regard, the engine controller 50 normally closes the ABV 44 and when the engine 10 decelerates from a forced induction range, opens the ABV 44. As a result, the highly compressed air confined in the portion of the intake passage 11 between the compressor wheel 41 and the throttle valve 27 is released to the upstream side of the compressor wheel 41 in the intake passage 11.

The fuel injection amount control of the injector 29 executed by the engine controller 50 will now be described. In the fuel injection amount control, the engine controller 50 calculates an intake air amount KL, which is the mass of intake air that is burned in the combustion chamber 12, from the AFM output Qa or the like. The engine controller 50 calculates the fuel injection amount Qi as a value needed to reach the target air-fuel ratio based on the calculation result of the intake air amount KL. Then, the engine controller 50 transmits an instruction signal instructing a fuel injection corresponding to the value of the fuel injection amount Qi to the injector 29 to control the fuel injection amount.

Intake air intermittently flows into the combustion chamber 12 in accordance with the opening and closing of the intake valve 14. This generates intake pulsation in the intake passage 11 and generates an error in the AFM output Qa. In this regard, when calculating the intake air amount KL, the AFM output Qa is corrected to compensate for the error caused by the intake pulsation. In the present embodiment, the AFM output Qa is corrected using a base correction coefficient C1, which is obtained from the engine rotation speed NE and the throttle opening degree TA, and a forced induction correction coefficient C2, which is obtained from the engine rotation speed NE and a compressor front-rear pressure ratio PR. The compressor front-rear pressure ratio PR is a ratio of the compressor outlet pressure P3 to the compressor inlet pressure P1 (=P3/P1).

Figure 2:
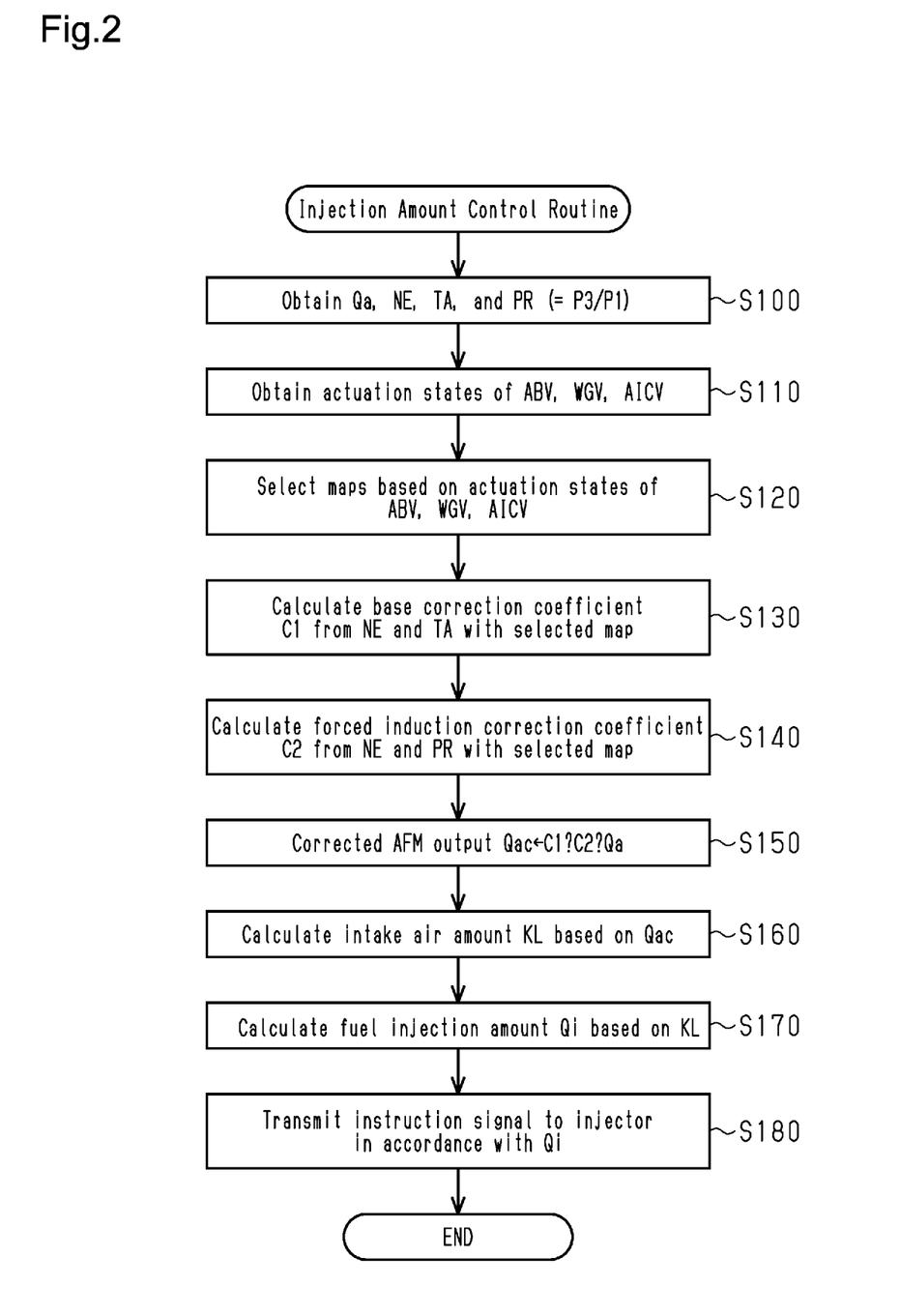
FIG. 2 is a flowchart of an injection amount control routine executed by the engine controller.
Figure 3:
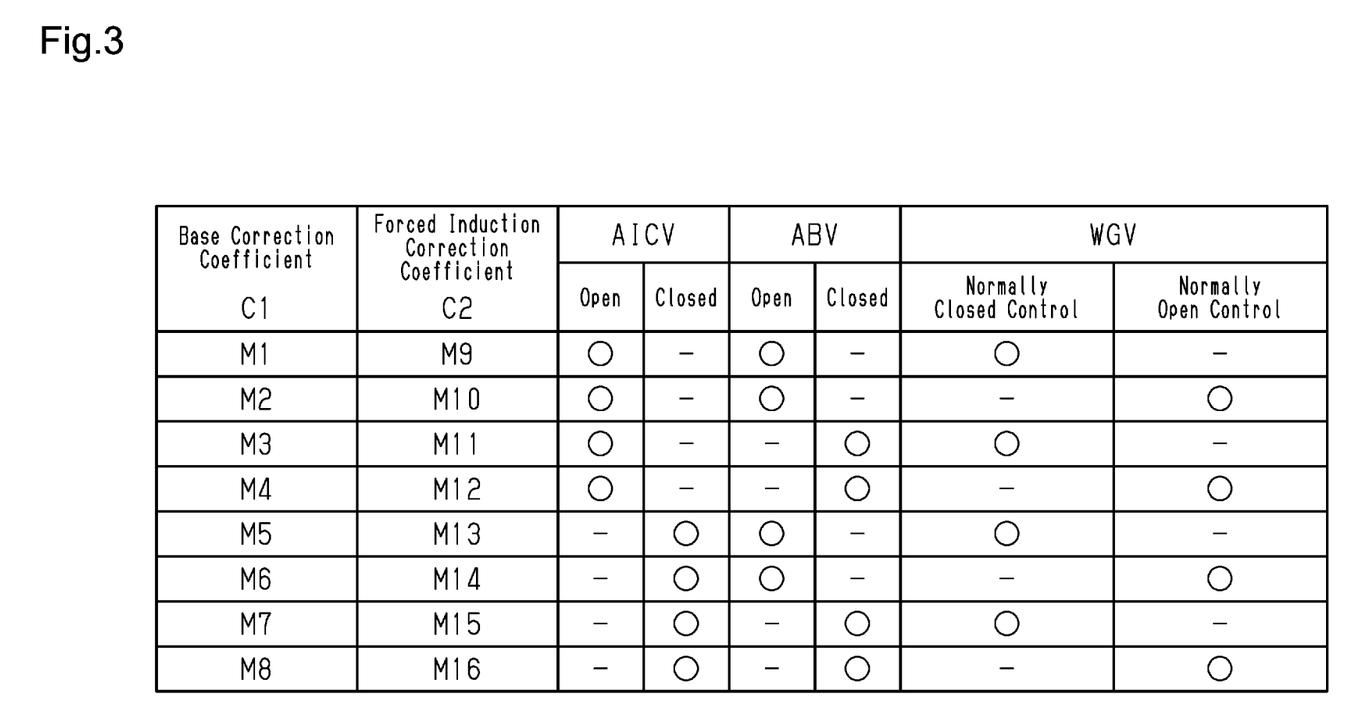
FIG. 3 is a table showing a correspondence relationship of actuation states of AICV, ABV, and WGV with maps used by the engine controller when calculating a base correction coefficient and a forced induction correction coefficient.

FIG. 2 shows the procedure of the injection amount control routine executed by the engine controller 50 to control the fuel injection amount. The engine controller 50 repeatedly executes the process of this routine in predetermined control cycles while the engine 10 is running.

When the process of the routine is started, in step S100, the AFM output Qa, the engine rotation speed NE, and the throttle opening degree TA are obtained. In addition, in step S100, the compressor front-rear pressure ratio PR is obtained from the compressor inlet pressure P1 and the compressor outlet pressure P3. In step S110, the actuation states of the ABV 44, the WGV 46, and the AICV 23 are obtained. More specifically, whether the ABV 44 and the AICV 23 are open or closed is obtained, and whether the WGV 46 is under the normal open control or the normal close control is obtained.

The storage device 52 stores eight maps M1 to M8 in advance as maps for calculating the base correction coefficient C1. The storage device 52 also stores eight maps M9 to M16 as maps for calculating the forced induction correction coefficient C2. In step S120, a map that is used to calculate each of the base correction coefficient C1 and the forced induction correction coefficient C2 is selected in accordance with the actuation states of the AICV 23, the ABV 44, and the WGV 46. In FIG. 3, the actuation state of each of the AICV 23, the ABV 44, and the WGV 46 is indicated by a circle when each of the maps M1 to M16 is selected. For example, when the map M1 is selected as the map for calculating the base correction coefficient C1 and the map M9 is selected as the map for calculating the forced induction correction coefficient C2, the AICV 23 and the ABV 44 are open, and the WGV 46 is under the normal close control.

When each of the AICV 23, the ABV 44, and the WGV 46 maintains a certain actuation state, each of the engine rotation speed NE and the throttle opening degree TA maintains a certain value, and the engine 10 continues to run, the compressor front-rear pressure ratio PR, ultimately the flow rate of intake air in the intake passage 11, converges on a certain value. As the flow rate of intake air converges, the error of the AFM output Qa caused by the intake pulsation also converges on a certain value. In the description hereafter, the ratio of an actual intake air flow rate Qreal to the AFM output Qa (=Qreal/Qa) is referred to as an error ratio of the AFM output Qa. When the compressor front-rear pressure ratio PR is converged on a certain value as described above, the error ratio of the AFM output Qa is referred to as a steady error ratio. Each of the maps M1 to M8 stores the relationship of the steady error ratio of the AFM output Qa with the engine rotation speed NE and the throttle opening degree TA when each of the AICV 23, the ABV 44, and the WGV 46 is in its corresponding actuation state.

When each of the AICV 23, the ABV 44, and the WGV 46 maintains a certain actuation state, each of the engine rotation speed NE and the throttle opening degree TA maintains a certain value, and the engine 10 runs, during a transition period until the compressor front-rear pressure ratio PR converges on a certain value, the error of the AFM output Qa changes in accordance with changes in the compressor front-rear pressure ratio PR. In the description hereafter, a ratio of the error ratio of the AFM output Qa to the steady error ratio in the transition period described above is referred to as a forced induction error ratio. Each of the maps M9 to M16 stores the relationship of the forced induction error ratio of the AFM output Qa with the engine rotation speed NE and the compressor front-rear pressure ratio PR when each of the AICV 23, the ABV 44, and the WGV 46 is in its corresponding actuation state.

The relationship of the values stored in the maps M1 to M16 is obtained in advance by experiments or the like. The product of the base correction coefficient C1 and the forced induction correction coefficient C2 corresponds to a pulsation correction value that is used to compensate for the output error of the airflow meter 24 caused by the intake pulsation.

In step S130, the map selected in step S120 is used to calculate the steady error ratio corresponding to the present engine rotation speed NE and the present throttle opening degree TA as a value of the base correction coefficient C1. In step S140, the map selected in step S120 is used to calculate the forced induction error ratio corresponding to the present engine rotation speed NE and the present compressor front-rear pressure ratio PR (=P3/P1) as a value of the forced induction correction coefficient C2. In step S150, the product of the AFM output Qa, the base correction coefficient C1, and the forced induction correction coefficient C2 is calculated as a value of a corrected AFM output Qac.

In step S160, the intake air amount KL is calculated based on the corrected AFM output Qac and the engine rotation speed NE. In step S170, the fuel injection amount Qi is calculated from the intake air amount KL. In step S180, an instruction signal instructing a fuel injection corresponding to the value of the fuel injection amount Qi is transmitted to the injector 29, and then the present process of the routine is terminated.

Steps S130 and S140 of the injection amount control routine correspond to a correction value calculation process that calculates the pulsation correction value, which is used to compensate for an output error of the airflow meter 24 caused by intake pulsation, based on the engine rotation speed, the opening degree of the throttle valve, the boost pressure, and the actuation state of the variable mechanism. Step S150 of the injection amount control routine corresponds to a correction process that corrects an output of the airflow meter 24 based on the pulsation correction value. Steps S160 and S170 correspond to an injection amount calculation process that calculates the fuel injection amount Qi of the injector 29 based on the output of the airflow meter 24 that has been corrected by the correction process. Step S180 of the injection amount control routine corresponds to an operation process that operates the injector 29 to inject fuel corresponding to the calculated value of the fuel injection amount, which is calculated by the injection amount calculation process.

The operation and advantages of the present embodiment will now be described.

In the engine 10, when the intake valve 14 is open and intake air flows into the combustion chamber 12, the intake pressure of the portion of the intake passage 11 connected to the combustion chamber 12, that is, the intake port, decreases. Subsequently, when the intake valve 14 is closed, the intake air drawn into the intake passage 11 from the upstream side is confined and increases the intake pressure of the intake port. The resulting pressure variation in the intake air moves upstream in the intake passage 11 and is reflected at the openings of the air ducts 21 and 22. This generates a standing wave in the intake passage 11. As a result, if pulsation is increased in the intake air passing the hot wire of the airflow meter 24, an error of the AFM output Qa increases. In the description hereafter, a flow pulsation of the intake air passing the hot wire of the airflow meter 24 is referred to as the intake pulsation of the airflow meter 24.

Amplitude of the intake pulsation increases at an antinode of the standing wave and decreases at a node of the standing wave. Positions of the antinode and the node of the standing wave in the intake passage 11 change in accordance with the wavelength of the intake pulsation. An error in the AFM output Qa caused by the intake pulsation changes in accordance with the relationship between the position of the airflow meter 24 and the positions of the antinode and the node of the standing wave in the intake passage 11.

The wavelength of the intake pulsation is dependent on the opening-closing cycle of the intake valve 14 and thus the engine rotation speed NE. When the throttle opening degree TA is relatively small, the throttle valve 27 acts as a weir that hinders upstream movement of the intake pulsation in the intake passage 11. Therefore, even when the positions of the antinode and the node of the standing wave in the intake passage 11 remain the same, when the throttle opening degree TA is relatively small, the amplitude of the intake pulsation of the airflow meter 24 is smaller than when the throttle opening degree TA is relatively large. The amplitude and the wavelength of the intake pulsation also change in accordance with the density of the intake air. In the engine 10, when the compressor outlet pressure P3 is increased by a forced induction of the exhaust turbocharger 40, the density of the intake air is increased in the portion of the intake passage 11 between the compressor wheel 41 and the throttle valve 27. Thus, the error in the AFM output Qa caused by the intake pulsation changes in accordance with the engine rotation speed NE, the throttle opening degree TA, and the compressor front-rear pressure ratio PR (=P3/P1).

In the engine 10 including the AICV 23, the opening and closing of the AICV 23 change the pipe length of the intake passage 11 and changes the positions of the antinode and the node of the standing wave in the intake passage 11. Hence, in the engine 10, the actuation state of the AICV 23 also changes the amplitude of the intake pulsation of the airflow meter 24 and ultimately changes the error in the AFM output Qa caused by the intake pulsation.

As described above, the engine 10 includes the ABV 44, which changes the shape of the intake flow passage, and the WGV 46, which changes the shape of the exhaust flow passage, as variable mechanisms that change the shape of a gas flow passage in the exhaust turbocharger 40. When the ABV 44 is open, the intake bypass 43 is added to a pressure wave propagation path of the intake passage 11. Thus, the positions of the antinode and the node of the standing wave in the intake passage 11 change from those when the ABV 44 is closed. When the WGV 46 is closed, the entire exhaust gas discharged from the combustion chamber 12 passes through the turbine wheel 42. When the WGV 46 is closed, pressure loss of the exhaust gas passing through the turbine wheel 42 is increased from when the WGV 46 is open. This increases the exhaust pressure of the exhaust passage 13 upstream of the turbine wheel 42, that is, back pressure of the engine 10. When the back pressure of the engine 10 is increased, the intake air that entered the combustion chamber 12 is forced back into the intake passage 11 during a valve overlap period in which the intake valve 14 and the exhaust valve 15 are both open. This increases variations in the intake pressure of the intake port. As described above, in the engine 10 including the ABV 44 and the WGV 46 as variable mechanisms that change the shape of the gas flow passage in the exhaust turbocharger 40, the actuation state of each variable mechanism also changes the amplitude of the intake pulsation of the airflow meter 24 and ultimately changes the error in the AFM output Qa caused by the intake pulsation.

In the present embodiment, the control of the WGV 46 is switched between the normal open control and the normally closed control. Even at the same engine rotation speed NE and the same throttle opening degree TA, the actuation state of the WGV 46 may differ between when the WGV 46 is under the normally open control and when the WGV 46 is under the normally closed control.

The engine controller 50 selects maps used to calculate the base correction coefficient C1 and the forced induction correction coefficient C2 from the maps M1 to M16 in accordance with the actuation states of the AICV 23, the ABV 44, and the WGV 46. The engine controller 50 uses the selected maps to calculate the base correction coefficient C1 from the engine rotation speed NE and the throttle opening degree TA and calculate the forced induction correction coefficient C2 from the engine rotation speed NE and the compressor front-rear pressure ratio PR. The engine controller 50 obtains the product of the base correction coefficient C1 and the forced induction correction coefficient C2 as the pulsation correction value used to compensate for the error in the AFM output Qa caused by the intake pulsation. That is, the engine controller 50 calculates the pulsation correction value based on the actuation states of the AICV 23, the ABV 44, and the WGV 46 in addition to the engine rotation speed NE, the throttle opening degree TA, and the compressor front-rear pressure ratio PR.

The engine controller 50 calculates the intake air amount KL based on the corrected AFM output Qac, which is a value obtained by correcting the AFM output Qa based on the pulsation correction value, and also calculates the fuel injection amount Qi from the intake air amount KL. This accurately decreases a calculation error of the intake air amount KL caused by an error in the AFM output Qa caused by the intake pulsation and ultimately decreases a calculation error of the fuel injection amount Qi, which is calculated based on the intake air amount KL.

The engine controller 50 of the present embodiment obtains the following advantages.

(1) Outputs of the airflow meter 24 include an error caused by the intake pulsation of the intake passage 11. A generation state of the intake pulsation in the intake passage 11 changes in accordance with the engine rotation speed NE, the throttle opening degree TA, and the compressor front-rear pressure ratio PR. In addition, in the engine 10 including variable mechanisms such as those described above, when the variable mechanisms change the shapes of the intake flow passage and the exhaust flow passage of the exhaust turbocharger 40, the change in the shapes of the gas flow passage also changes the generation state of the intake pulsation in the intake passage 11. In this regard, in the present embodiment, the pulsation correction value is calculated based on the actuation states of the ABV 44 and the WGV 46, which are variable mechanisms that change the shape of the gas flow passage of the exhaust turbocharger 40, in addition to the engine rotation speed NE, the throttle opening degree TA, and the compressor front-rear pressure ratio PR. The pulsation correction value is calculated as a value that reflects a change in the intake pulsation in accordance with the actuation states of the variable mechanisms. This improves the accuracy of calculating the intake air amount KL based on the AFM output Qa and ultimately improves the accuracy of controlling the fuel injection amount based on the calculation result of the intake air amount KL.

(2) The engine controller 50 calculates the pulsation correction value based on the actuation state of the AICV 23. In this case, the pulsation correction value also reflects a change in the intake pulsation caused by the actuation state of the AICV 23. This improves the accuracy of calculating the intake air amount KL based on the AFM output Qa and also improves the accuracy of controlling the fuel injection amount based on the calculation result of the intake air amount KL.

The present embodiment may be modified as follows. The embodiment and the following modified examples can be combined as long as the combined modified examples remain technically consistent with each other.

In the embodiment, the maps used to calculate the base correction coefficient C1 and the forced induction correction coefficient C2 are switched in accordance with the actuation states of the AICV 23, the ABV 44, and the WGV 46. However, the base correction coefficient C1 and the forced induction correction coefficient C2 may be calculated based on the actuation states of the AICV 23, the ABV 44, and the WGV 46 without switching the maps. For example, the base correction coefficient C1 may be calculated using a single map that stores the relationship of the base correction coefficient C1 with the actuation states of the AICV 23, the ABV 44, and the WGV 46, the engine rotation speed NE, and the throttle opening degree TA. In the same manner, the forced induction correction coefficient C2 may be calculated using a single map that stores the relationship of the forced induction correction coefficient C2 with the actuation states of the AICV 23, the ABV 44, the WGV 46, the engine rotation speed NE, and the compressor front-rear pressure ratio PR. Moreover, instead of using maps, the base correction coefficient C1 and the forced induction correction coefficient C2 may be calculated using a numerical expression expressing the relationship described above.

In the embodiment, the two correction coefficients, namely, the base correction coefficient C1 and the forced induction correction coefficient C2, are calculated, and the product of the two correction coefficients is obtained as the pulsation correction value. Instead, the pulsation correction value may be directly calculated based on the actuation states of the AICV 23, the ABV 44, and the WGV 46, the engine rotation speed NE, the throttle opening degree TA, and the compressor front-rear pressure ratio PR.

In the embodiment, the compressor front-rear pressure ratio PR, which is the ratio of the compressor outlet pressure P3 to the compressor inlet pressure P1, is used to calculate the pulsation correction value. When it may be considered that the compressor inlet pressure P1 is constant, the compressor outlet pressure P3, that is, the boost pressure, may be used instead of the compressor front-rear pressure ratio PR.

In the embodiment, whether the WGV 46 is controlled under the normal open control or the normal close control is reflected on calculation of the pulsation correction value. However, the opening degree of the WGV 46 or whether the WGV 46 is open or closed may be reflected on the calculation of the pulsation correction value. Also, in this case, the pulsation correction value is calculated as a value that reflects a change in the intake pulsation in accordance with the actuation state of the WGV 46.

In the embodiment, whether the AICV 23 and the ABV 44 are open or closed is reflected on calculation of the pulsation correction value. When the AICV 23 and the ABV 44 are controlled under a variable control in which an opening degree varies in a stepped manner or a stepless manner instead of the binary switching control that switches a valve between the open state and the closed state, the pulsation correction value may be calculated with reference to the opening degrees of the AICV 23 and the ABV 44.

When the actuation state of the AICV 23 subtly affects the intake pulsation or when the engine 10 does not include the AICV 23, the pulsation correction value may be calculated without using the actuation state of the AICV 23. Even in this case, when the pulsation correction value is calculated with reference to the actuation states of the ABV 44 and the WGV 46, the pulsation correction value is calculated as a value that reflects a change in the intake pulsation in accordance with the actuation states.

When the actuation state of the ABV 44 subtly affects the intake pulsation or when the exhaust turbocharger 40 includes the WGV 46 and does not include the ABV 44, the pulsation correction value may be calculated without referring to the actuation state of the ABV 44. Even in this case, when the pulsation correction value is calculated with reference to the actuation state of the WGV 46, the pulsation correction value is calculated as a value that reflects the effect of the actuation state of the WGV 46 on the intake pulsation.

When the actuation state of the WGV 46 subtly affects the intake pulsation or when the exhaust turbocharger 40 includes the ABV 44 and does not include the WGV 46, the pulsation correction value may be calculated without referring to the actuation state of the WGV 46. Even in this case, when the pulsation correction value is calculated with reference to the actuation state of the ABV 44, the pulsation correction value is calculated as a value that reflects the effect of the actuation state of the ABV 44 on the intake pulsation.

An exhaust turbocharger may include a variable nozzle that changes the area of an opening of an exhaust ejection port to the turbine wheel. Such a variable nozzle is a type of variable mechanism that changes the shape of an exhaust flow passage of the exhaust turbocharger. When the area of the opening of the exhaust ejection port is changed by the variable nozzle, pressure loss of the exhaust gas changes at the exhaust ejection port, and the back pressure of the engine 10 changes. Thus, the actuation state of the variable nozzle also changes the intake pulsation of the airflow meter 24. When the exhaust turbocharger includes a variable nozzle, it is desirable that the pulsation correction value is calculated based on the actuation state of the variable nozzle.

The arithmetic processing device 51 may include dedicated hardware (application specific integrated circuit: ASIC) that executes at least some of various processes. That is, the arithmetic processing device 51 may be circuitry including 1) one or more processors that operate according to a computer program (software), 2) one or more dedicated hardware circuits such as an ASIC, or 3) a combination thereof. The processors include a CPU and memory such as RAM and ROM. The memory stores program codes or instructions configured to cause the CPU to execute processes. The memory, or a computer readable medium, includes any type of medium that is accessible by a general-purpose computer and a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine controller used for an engine, the engine including an airflow meter arranged in an intake passage, an exhaust turbocharger including a compressor wheel arranged in the intake passage downstream of the airflow meter and a turbine wheel arranged in an exhaust passage, a throttle valve arranged in the intake passage downstream of the compressor wheel, a variable mechanism that changes a shape of a gas flow passage of the exhaust turbocharger, and an injector that is operated by the engine controller and injects fuel that is burned in a combustion chamber, the engine controller, comprising:

an arithmetic processing device configured to execute
a correction value calculation process that calculates a pulsation correction value based on a rotation speed of the engine, an opening degree of the throttle valve, a boost pressure, and an actuation state of the variable mechanism, the pulsation correction value being used to compensate for an output error of the airflow meter caused by intake pulsation,
a correction process that corrects an output of the airflow meter using the pulsation correction value,
an injection amount calculation process that calculates a fuel injection amount of the injector, based on the output of the airflow meter that has been corrected by the correction process, and
an operation process that operates the injector to inject fuel corresponding to a value of the fuel injection amount calculated by the injection amount calculation process.

2. The engine controller according to claim 1, wherein
the variable mechanism includes an air bypass valve arranged in an intake bypass passage that bypasses the compressor wheel and allows an intake air to flow, and
the air bypass valve is configured to allow the intake air to flow through the intake bypass passage when the air bypass valve is open, and interrupt flow of the intake air through the intake bypass passage when the air bypass valve is closed.

3. The engine controller according to claim 1, wherein
the variable mechanism includes a wastegate valve arranged in an exhaust bypass passage that bypasses the turbine wheel and allows an exhaust gas to flow, and
the wastegate valve is configured to allow the exhaust gas to flow through the exhaust bypass when the wastegate valve is open, and interrupt flow of the exhaust gas through the exhaust bypass passage when the wastegate valve is closed.

4. An engine controller used for an engine, the engine including an airflow meter arranged in an intake passage, an exhaust turbocharger including a compressor wheel arranged in the intake passage downstream of the airflow meter and a turbine wheel arranged in an exhaust passage, a throttle valve arranged in the intake passage downstream of the compressor wheel, a variable mechanism that changes a shape of a gas flow passage of the exhaust turbocharger, and an injector that is operated by the engine controller and injects fuel that is burned in a combustion chamber, the engine controller, comprising:

circuitry as an arithmetic processing device, wherein the circuitry is configured to execute
a correction value calculation process that calculates a pulsation correction value based on a rotation speed of the engine, an opening degree of the throttle valve, a boost pressure, and an actuation state of the variable mechanism, the pulsation correction value being used to compensate for an output error of the airflow meter caused by intake pulsation,
a correction process that corrects an output of the airflow meter using the pulsation correction value,
an injection amount calculation process that calculates a fuel injection amount of the injector, based on the output of the airflow meter that has been corrected by the correction process, and
an operation process that operates the injector to inject fuel corresponding to a value of the fuel injection amount calculated by the injection amount calculation process.

5. An engine control method used for an engine, the engine including an airflow meter arranged in an intake passage, an exhaust turbocharger including a compressor wheel arranged in the intake passage downstream of the airflow meter and a turbine wheel arranged in an exhaust passage, a throttle valve arranged in the intake passage downstream of the compressor wheel, a variable mechanism that changes a shape of a gas flow passage of the exhaust turbocharger, and an injector that is operated by the engine controller and injects fuel that is burned in a combustion chamber, the engine control method, comprising:

a correction value calculation process that calculates a pulsation correction value based on a rotation speed of the engine, an opening degree of the throttle valve, a boost pressure, and an actuation state of the variable mechanism, the pulsation correction value being used to compensate for an output error of the airflow meter caused by intake pulsation,
a correction process that corrects an output of the airflow meter using the pulsation correction value,
an injection amount calculation process that calculates a fuel injection amount of the injector, based on the output of the airflow meter that has been corrected by the correction process, and
an operation process that operates the injector to inject fuel corresponding to a value of the fuel injection amount calculated by the injection amount calculation process.

* * * * *